US010232544B2

(12) United States Patent
Wicken et al.

(10) Patent No.: US 10,232,544 B2
(45) Date of Patent: Mar. 19, 2019

(54) METHOD OF MANUFACTURING A HELIUM-FREE BALLOON

(71) Applicant: Balloon Innovations Inc., Westminster, CO (US)

(72) Inventors: Christopher J. Wicken, Golden, CO (US); Gregg A. Wicken, Boulder, CO (US)

(73) Assignee: BALLOON INNOVATIONS, INC., Westminster, CO (US)

( * ) Notice: Subject to any disclaimer, the term of this patent is extended or adjusted under 35 U.S.C. 154(b) by 207 days.

(21) Appl. No.: 15/225,579

(22) Filed: Aug. 1, 2016

(65) Prior Publication Data
US 2017/0028658 A1   Feb. 2, 2017

Related U.S. Application Data

(60) Provisional application No. 62/199,720, filed on Jul. 31, 2015.

(51) Int. Cl.
*B29D 22/02* (2006.01)
*B29C 49/06* (2006.01)
*B29C 49/04* (2006.01)
*B29C 49/20* (2006.01)
*B29L 22/02* (2006.01)

(52) U.S. Cl.
CPC ............. *B29C 49/06* (2013.01); *B29C 49/04* (2013.01); *B29C 49/20* (2013.01); *B29C 2049/2008* (2013.01); *B29C 2049/2026* (2013.01); *B29C 2049/2043* (2013.01); *B29L 2022/022* (2013.01)

(58) Field of Classification Search
None
See application file for complete search history.

(56) References Cited

U.S. PATENT DOCUMENTS

| | | |
|---|---|---|
| 262,517 A | 8/1882 | Unz |
| 1,527,046 A | 10/1922 | Ingram |
| 1,512,831 A | 10/1924 | Dunnell |
| 1,535,396 A | 4/1925 | Buehler |
| 1,648,338 A | 11/1927 | Gains |
| 1,677,379 A | 7/1928 | Ames |
| 1,782,070 A | 11/1930 | Lazarus |
| 1,788,157 A | 1/1931 | Hogan |
| 2,143,691 A | 4/1938 | Goldberg et al. |
| 2,209,875 A | 7/1940 | Eichelsdoerfer |
| 2,488,396 A | 11/1949 | Gottholm |
| 2,664,667 A | 1/1954 | Burroughs |

(Continued)

FOREIGN PATENT DOCUMENTS

WO    2015195981 A1   12/2015

OTHER PUBLICATIONS

U.S. Appl. No. 14/742,855, filed Jun. 18, 2015, First Inventor: Christopher J. Wicken.

(Continued)

*Primary Examiner* — Monica A Huson
(74) *Attorney, Agent, or Firm* — Berg Hill Greenleaf Ruscitti LLP

(57) ABSTRACT

The inventive technology encompasses new and novel methods for manufacturing helium-free balloons using improved injection molding systems and techniques. The invention includes new and novel preform, as well as parison based methods and methods of manufacturing integrated helium-free balloons compatible with external support components.

26 Claims, 4 Drawing Sheets

(56) References Cited

U.S. PATENT DOCUMENTS

Figure 1A:
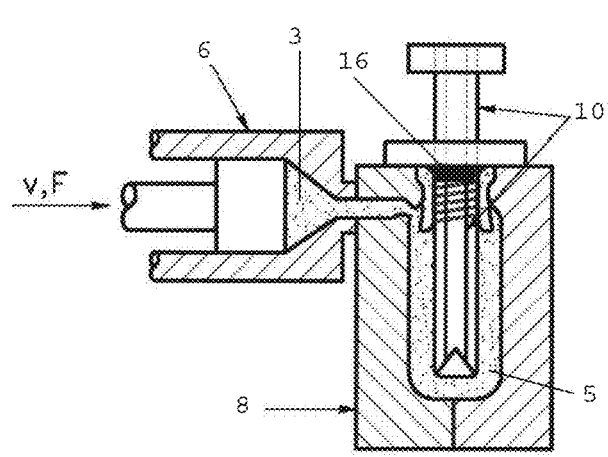

| | | |
|---|---|---|
| 2,840,948 A | 7/1958 | Stickley |
| 2,922,252 A | 1/1960 | Van Dam |
| 2,924,041 A | 2/1960 | Jackson |
| 3,150,460 A | 9/1964 | Dees |
| 3,162,409 A | 12/1964 | Straayer |
| 3,192,568 A | 7/1965 | Nicholls |
| 3,366,999 A | 2/1968 | Darby |
| 3,439,079 A | 4/1969 | McDowell |
| 3,892,081 A | 11/1975 | Goral |
| 3,920,207 A | 11/1975 | Adamaitis |
| 4,035,462 A | 7/1977 | Lane, Jr. |
| 4,589,854 A | 5/1986 | Smith |
| 4,712,510 A | 12/1987 | Tae-Ho |
| 4,794,498 A | 12/1988 | Neumeier |
| 4,895,545 A | 1/1990 | Nelson et al. |
| 4,953,713 A | 9/1990 | Yaffe |
| 5,027,992 A | 7/1991 | Murray |
| 5,036,985 A | 8/1991 | Lovik |
| 5,052,733 A | 10/1991 | Cheung et al. |
| 5,127,867 A | 7/1992 | Lau |
| 5,188,332 A | 2/1993 | Callas |
| 5,203,530 A | 4/1993 | Liu |
| 5,234,726 A | 8/1993 | Dahan |
| 5,282,768 A | 2/1994 | Akman |
| 5,564,575 A | 10/1996 | Casement |
| 5,575,470 A | 11/1996 | Sherman |
| 5,746,461 A | 5/1998 | Broberg |
| 5,769,474 A | 6/1998 | Moore |
| 5,823,365 A | 10/1998 | Page |
| 5,873,764 A | 2/1999 | Scherr |
| 5,938,255 A | 8/1999 | Rose et al. |
| 5,944,576 A | 8/1999 | Nelson et al. |
| 6,176,758 B1 | 1/2001 | Wu |
| 6,273,479 B1 | 8/2001 | Carlson |
| 6,422,914 B1 | 7/2002 | Nelson |
| 6,478,057 B1 | 11/2002 | Bearss et al. |
| 6,478,651 B1 | 11/2002 | Weir |
| 6,745,904 B1 | 6/2004 | Komar |
| 6,923,141 B1 | 8/2005 | Staats |
| 6,935,268 B1 | 8/2005 | Hawkins |
| 6,938,871 B1 | 9/2005 | Carlson |
| 6,969,295 B1 | 11/2005 | Sidwell |
| D517,123 S | 3/2006 | Sidwell |
| 7,017,511 B2 | 3/2006 | Fisher |
| 7,249,991 B1 | 7/2007 | Watson |
| 7,588,477 B2 | 9/2009 | Sidwell |
| 7,611,395 B2 | 11/2009 | Bonsembiante |
| D610,208 S | 2/2010 | Hou |
| 7,810,265 B2 | 10/2010 | Beatty |
| 7,854,642 B2 | 12/2010 | Nelson et al. |
| 7,967,344 B2 | 6/2011 | Herren |
| 8,152,588 B2 | 4/2012 | Hua |
| D659,200 S | 5/2012 | Wicken |
| 8,544,407 B2 | 10/2013 | Spray |
| 8,789,565 B1 | 7/2014 | Wicken |
| 8,840,440 B2 | 9/2014 | Pierce |
| 8,968,047 B1 | 3/2015 | Wicken |
| 9,087,462 B1 | 7/2015 | Gallus |
| 9,132,595 B1 | 9/2015 | Wicken et al. |
| 9,809,784 B2 | 11/2017 | Wang et al. |
| 2001/0045074 A1 | 11/2001 | Kim |
| 2003/0071185 A1 | 4/2003 | Casapulla |
| 2004/0077268 A1 | 4/2004 | Wainhou |
| 2006/0011793 A1 | 1/2006 | Dupuis et al. |
| 2006/0289707 A1 | 12/2006 | Greenwald et al. |
| 2006/0292960 A1 | 12/2006 | Muller |
| 2007/0007424 A1 | 1/2007 | Sifferlin et al. |
| 2007/0049158 A1 | 3/2007 | Chou |
| 2007/0218802 A1 | 9/2007 | Gronethal |
| 2008/0121309 A1 | 5/2008 | Boise et al. |
| 2008/0166942 A1 | 7/2008 | Hou |
| 2008/0166943 A1 | 7/2008 | Hou |
| 2009/0197502 A1 | 8/2009 | Nelson et al. |
| 2011/0240823 A1 | 10/2011 | Hua |
| 2011/0253876 A1 | 10/2011 | Odell |
| 2011/0290171 A1 | 12/2011 | Brick |
| 2012/0015581 A1 | 1/2012 | Feldstein |
| 2012/0211614 A1 | 8/2012 | Parello et al. |
| 2014/0096867 A1 | 4/2014 | Cayton |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
Amazon: Arizona Balloons; Jan. 24, 2013.
Free Patents Online IP Research & Communities—Rotational Molding; Jan. 24, 2013.
Giant Advertising Balloons; Jan. 24, 2013.
Polyurethane Balloons—Balloon Country; Jan. 24, 2013.
Professional Weather Balloons, 3, 8, and 16 Foot Diameters, Edmund Scientific; Jan. 24, 2013.
Roto—Balloon Printing; Jan. 24, 2013.
Weather Balloons—NovaLynx Corporation; Jan. 24, 2013.
Design U.S. Appl. No. 29/4444,898, filed Feb. 5, 2013, First Inventor: Christopher J. Wicken.
Free Patents Online IP Research & Communities—Rotomolding; Jan. 24, 2013.
International Application No. PCT/US15/036527, filed Jul. 21, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.
U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.
U.S. Appl. No. 29/444,898, filed Feb. 5, 2013, First Inventor: Christopher J. Wicken. Office Action dated Mar. 18, 2016. 7 pages.
U.S. Appl. No. 15/076,182, filed Mar. 21, 2016, First Inventor: Christopher J. Wicken. Office Action dated Jun. 3, 2016. 8 pages.
Balloons Everywhere, Everyday Catalog & Buyers Guide. Wholesale Balloons & Floral Accessories. © 2007, 2008 Balloons Are Everywhere, Inc. 10 pages.

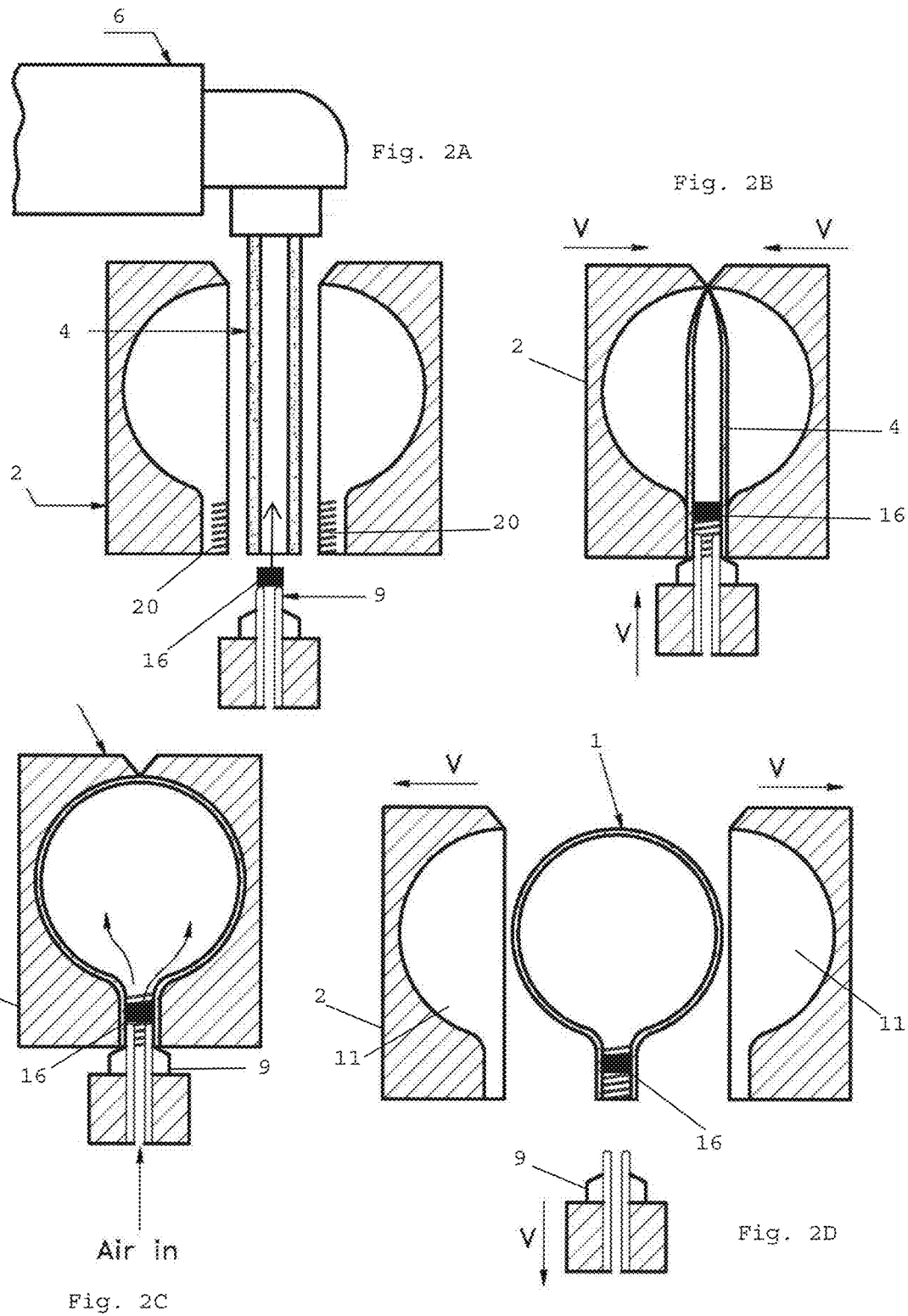

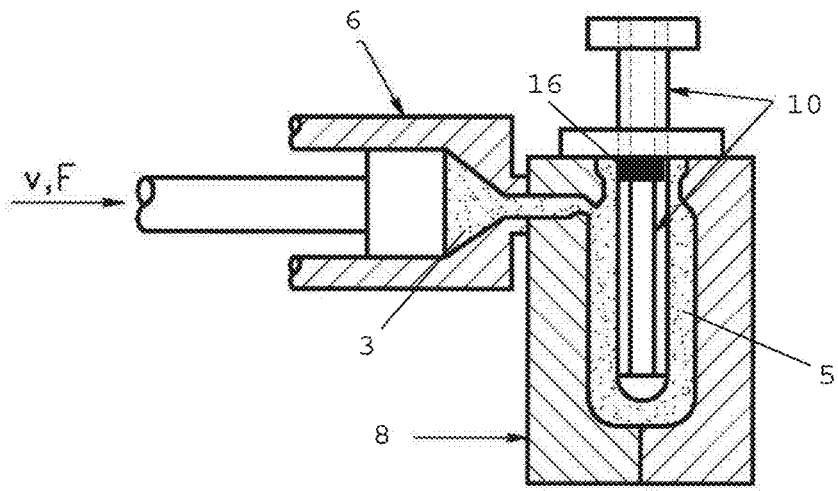
Fig. 3A
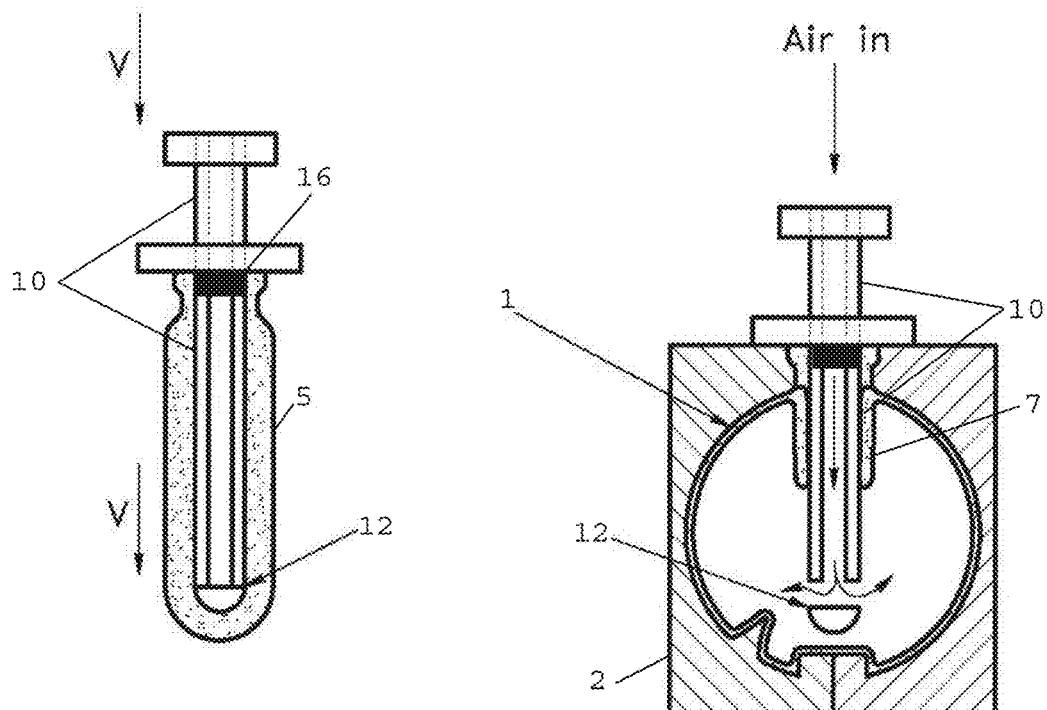
Fig. 3B
Fig. 3C

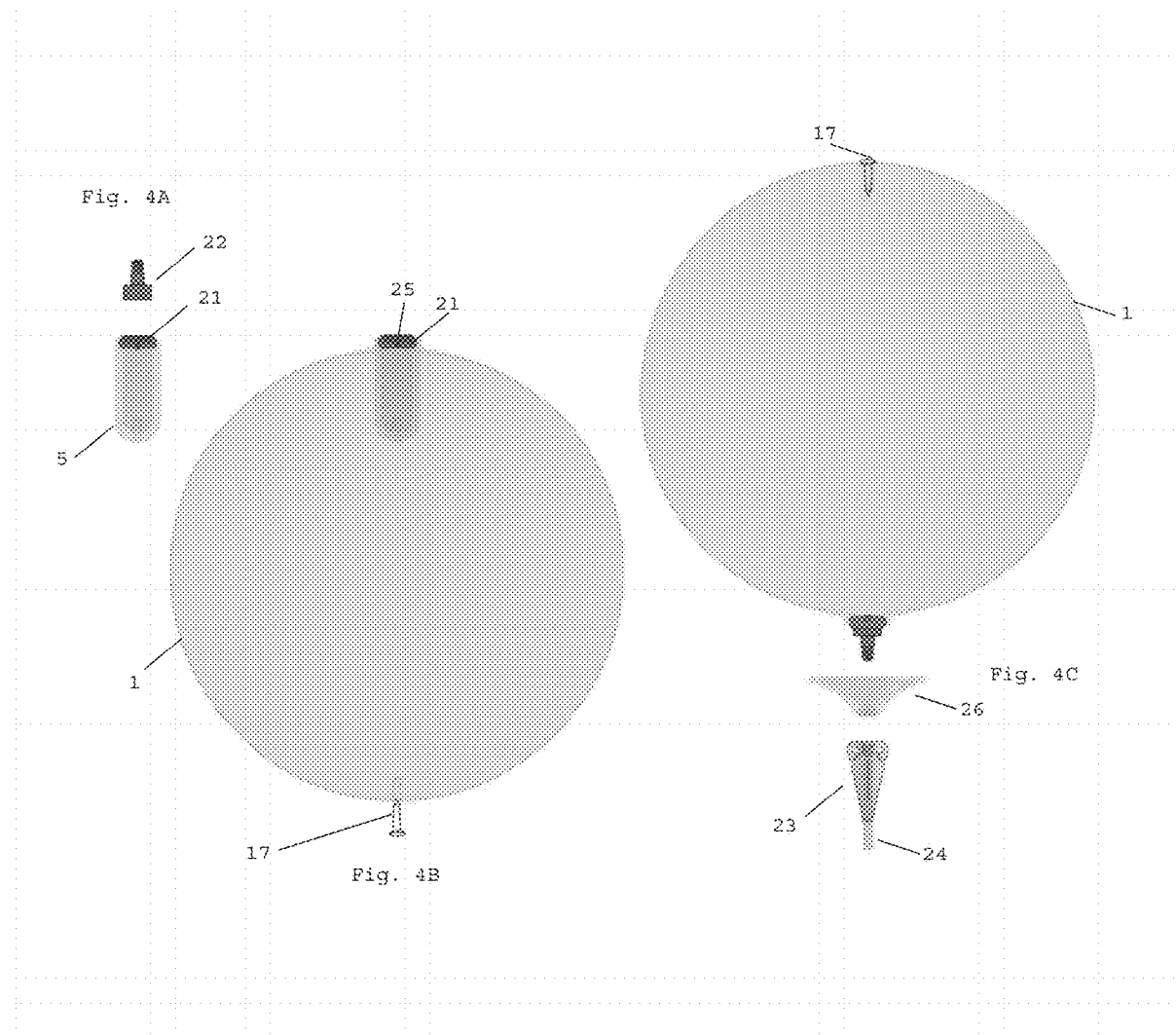

METHOD OF MANUFACTURING A HELIUM-FREE BALLOON

This application claims the benefit of and priority to U.S. Provisional Application No. 62/199,720 filed Jul. 31, 2015. The entire specification and figures of the above-mentioned application is hereby incorporated, in its entirety by reference.

TECHNICAL FIELD

Generally, the inventive technology disclosed herein relates to improved materials and methods for the manufacture and display of helium-free balloons. More specifically, the inventive technology may involve methods, apparatus, techniques, and systems for the creation of helium-free balloons and display systems that may be used in various commercial, residential or decorative displays. This inventive technology may be particularly suited for helium-free balloons and display systems that are positioned outside commercial establishments to attract attention and/or highlight a specific promotion or event. In certain embodiments, such improved methods involve blow/injection molding helium-free balloons, which may further be seamless. Additional embodiments may involve the use of novel materials, such as flexible/elastic thermoplastics to create helium-free balloons not typically associated with blow molding processes.

The current inventive technology provides numerous novel and commercially advantageous features including, but not limited to helium-free balloons having: 1) enhanced durability and product life; 2) increased resistance to deformation resulting from pressure and/or temperature changes as well as tearing; 3) UV and abrasion resistance; 4) decreased weight and material use; and 5) improved aesthetic appearance.

BACKGROUND

Traditional helium filled balloons, whether used as novelties or displays, have been around for well over a century. Such traditional helium-filled balloons are generally made from latex or Mylar, however, these materials are limiting. For example, latex oxidizes quickly losing its elastic quality becoming brittle and deformed. In addition, latex poses a problem as it is a serious allergen for many people. Mylar, on the other hand quickly loses helium across its thin surface membrane limiting its ability to remain aloft for any significant amount of time.

Perhaps most limiting on such traditional balloons is the scarcity and expense of available helium. For example, the U.S. alone produces 75 percent of the world's helium. However, a lack of private sector helium producers, federal regulations and decline in U.S. Federal Helium Reserves have resulted in significant price increases and dwindling supplies of commercially available helium. Much of the available helium gas is currently being diverted to industrial and/or medical uses, such as MRI's, cryogenic preservation as well as scientific applications such as particle accelerators. Under these conditions, it is simply not cost effective to continue production of helium-dependent balloons.

Apart from these cost concerns, traditional helium based balloons also exhibit several functional disadvantages. First, helium is the second lightest element making it significantly lighter than air. While this imparts the typical "floating" characteristic of helium balloons, the helium is also known to be a very active gas, i.e. exhibits a high degree of Brownian atomic movement. As a result of helium's small size and high activity, traditional helium balloons rapidly lose their chemical equilibrium as the helium contained within the body of the balloon passes through the balloon membrane to the external environment. This results in a sagging appearance as well as the all too familiar "sinking" as the lighter than air helium escapes into the surrounding air. While a thicker membrane would slow this process, the additional weight would overcome the loft provided by the lighter-than-air helium rendering this option ultimately ineffective. The limitations have rendered helium-based balloons and display systems inefficient and uneconomic.

To overcome these limitations, helium-free balloon systems have been developed in recent years. However, such systems are also limited in several significant ways. The most obvious problem with such helium-free or "air-only" balloons is that they are not lighter than air and must rely on external supports or attachments to achieve the distinctive appearance common to helium-based balloons. Traditional manufacturing methods and materials for such helium-free balloons may also have significant limits to their practical and economic potential. Typically, traditional helium-free balloons are formed from disparate pieces of shaped plastic or PVC being placed together and physically sealed forming seamed helium-free balloons. Such material surfaces cannot be too thick or they may be prohibitively heavy and/or expensive and cannot be efficiently supported by external displays. Nor can these material surfaces be too thin or they will be prohibitively fragile and will not effectively hold pressurized air. Regardless of the final thickness, the resulting seams provide structural weak-points which are prone to tear, as well as allow pressurized gas to more rapidly escape, resulting in unwanted sagging and deflation. Moreover, pressure differences between the high-pressure air inside traditional helium-free balloons and the external environment may be especially pronounced during temperature changes, such as occur at night when the internal air pressure decreases, again resulting in unwanted sagging and deflation.

In addition, traditional seamed construction processes may also result in an unacceptably high defect rate. For example, it is currently estimated within the industry that as many as 5% of all traditional "seam" constructed helium-free balloons exhibit some type of manufacturing defect. Such defective products are difficult and costly to detect prior to any final end-user sale resulting in a significant waste of time, effort and resources. Traditional seamed structures are also limited by size. Naturally the larger the helium-free balloon, the larger the total surface area of the seam portions along its surface. This increased seam surface area not only increases the rate of manufacturing defects and therefore cost, but also exaggerates the air-pressure loss and temperature-based fluctuations described above. Again, this deflation effect is more pronounced in cold weather conditions. As such, there is a need for a single comprehensive solution to the limitations described above. It is the object of the present invention to provide a blow molded seamless helium-free balloon system to address the comprehensive concerns outlined above.

FIGURES

FIG. 1A-D: is a general diagram of a blow molding apparatus forming a helium-free balloon in one embodiment thereof;

FIG. 2A-D: a step-wise diagram of the blow molding of a seamless helium-free balloon in one embodiment thereof;

FIG. 3A-C: a step-wise diagram of the blow molding of a seamless helium-free balloon with exemplary external attachment and mount in one embodiment thereof; and FIG. 4A-C: is a step a step-wise diagram of the blow molding of a seamless helium-free balloon with an exemplary integral coupling in one embodiment thereof.

SUMMARY OF INVENTION

It is one object of the present invention to provide improved methods of manufacturing a helium-free balloon to address the comprehensive concerns outlined above. For example, it should be noted that various blow molding techniques may be employed to manufacture a helium-free balloon or, in some embodiments a seamless helium-free balloon—wherein again, seams may generally refer to seams that are be generated through thermal welding techniques. As generally shown in the figures, blow molding may be used to produce hollow articles of manufacture which are suitable for a variety of applications. In this embodiment one or more molding materials, such as various thermoplastics and the like, may be heated and formed into a parison and/or even a preform that may be expanded during the blow-molding process forming a seamless helium-free balloon.

In certain embodiments, the current invention may include steps for blow molding a seamless thermoplastic helium-free balloon. In some embodiments the invention may include methods to generate a helium-free polyurethane (PU) and/or thermoplastic polyurethane (TPU) balloon. PU and TPU (generally referred to as PU and/or thermoplastics) may impart several advantages to blow molded helium-free balloons. For example, at a chemical level PU is a polymer composed of a chain of organic units joined by urethane links. This may allow for stronger and more durable chemical bonds which in turn may allow for a more durable helium-free balloon. Indeed, based on this unique chemical structure, a helium-free balloon may be formed through blow-molding techniques having a thinner membrane than traditional helium-free balloons, yet may be stronger and more resistant to abrasion.

An additional benefit of having a lighter helium-free balloon, aside from the cost savings in materials needed and shipping, may include an improved visibility profile. In a preferred embodiment, a thermoplastic helium-free balloon, or balloon cluster may be secured to an external support such as those described in U.S. patent application Ser. Nos. 14/740,612, 14/743,839, and International Patent No. PCT/US15/36527 (all such apparatuses are incorporated herein by reference). In certain embodiments, such external supports may include one or more extended rods which may typically be formed from fiberglass, metal, plastic or other composite materials. Such a balloon display system may be secured to an external mount such as a weighted stand, or perhaps staked into the ground or attached to a pole outside a commercial establishment to generate consumer attention. Thermoplastic helium-free balloons, being typically lighter, may have greater lateral movement eliciting increased attraction by potential consumers. With this increased lateral movement, having a lighter helium-free balloon or even balloon cluster may reduce stress on any attached external display attachment, such as an extended rod. As can naturally be appreciated, a heavier PVC helium-free balloon supported by an extended rod may become overly stressed, for example, due to excessive bending as a result of wind or human action. This reduced leverage weight/force on any mounting tether point may reduce instances of product failure. For example, an exemplary helium-free balloon cluster formed with approximately 6 helium-free balloons each weighing 0.25 pounds may generally be supported by a fiberglass extended rod without a risk of failure. However, increasing the size of the balloons by a factor of 2 or 3 would likely require use of a metal extended rod to prevent failure, in for example, windy conditions.

Additionally, despite having perhaps a thinner membrane, pressurized gas may not cross a thermoplastic membrane as easily as traditional helium-free balloons and, as such, the current invention may retain a desired internal pressure for an extended period of time, if not indefinitely. One advantage of this is that such a helium-free balloon may not require additional or continuing inflation. Such advantages are maintained despite changes in temperature which may allow the invention to retain its original or desired shape across a spectrum of temperatures and climates. As such, the invention may allow the current inventive technology to be used year-round even in cold climate regions. Additional chemical properties may include improved resistance to UV radiation as well acidic conditions such as those caused by acid rain and other environmental pollutants.

DETAILED DESCRIPTION OF INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In one embodiment the inventive technology may include methods of manufacturing a helium-free balloon (1) utilizing a blow-molded preform process. In this embodiment, as shown in FIG. 1, one or more external attachments (16) may be secured to a blowing rod (10) which may further be inserted into a preform mold (8). In a preferred embodiment this external attachment (16) may be configured to be coupled with an external balloon support (23). In one embodiment, this external attachment (16) may include a hard plastic cylinder that may be configured to provide a strong anchor point for an external balloon support (23) or other component. In alternative embodiments, this external attachment (16) may include a variety of configurations and components, including but not limited to: a plug; a valve; a hard plastic external attachment; a threaded external attachment; a beveled external attachment; a ribbed external attachment and the like.

Referring again to FIG. 1A, in this embodiment an external attachment (16) is secured to a blowing rod (10), which may then be inserted into a preform mold (8). In this embodiment, the external attachment (16) may be transiently secured to a blowing rod (10), such that, as will be discussed below, when the blowing rod (10) is removed, the external attachment (16) may stay attached, or integrated, to the molded helium-free balloon (1). Again referring to FIG.

1A, a molding material (3), such as a thermoplastic—possibly in some cases in the form of a granule or pellet—may be heated to a point where it may be sufficiently viscous to be injected into a preform mold (8). As shown in the preferred embodiment in FIG. 1A, one or more molding materials (3) may be placed in an extruder barrel (6) which, in this embodiment may have an assembly that may also heat and melt the molding material. This extruder may further inject the heated molding material (3) into a preform mold (8), which may also be heated.

Again referring to FIG. 1A, in this preferred embodiment, the heated molding material (3) may enter into, and conform to the internal cavity of the preform mold (8). In addition, the viscous heated molding material (3) may be secured and/or adhered to the blowing rod (10) and external attachment (16) forming a preform (5). As shown in FIG. 1A, this preferred embodiment includes an integrated external attachment (16) as part of the preform (5) structure.

Figure 1B:
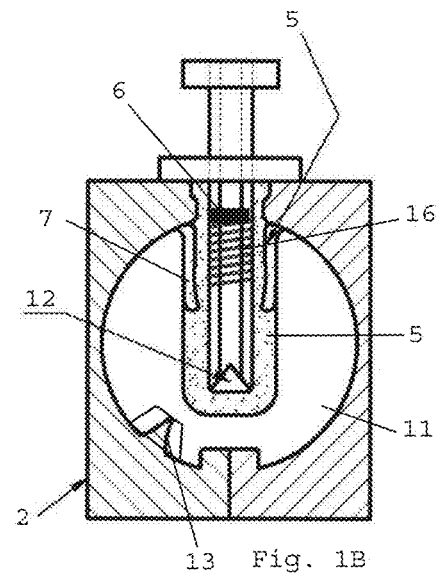

Referring now to FIG. 1B, in one embodiment this preform (5), having an integral external attachment (16), may initially resemble an elongated tube and may further be transferred from the preform mold (8) and positioned into a blow mold (2), which may be chilled. As shown in FIG. 1B, this blow mold (2) may include two or more components that may be brought together forming a blow mold cavity (11) around the preform (5). It should be noted that the joining of two blow mold components may cause the formation of small creases in the external surface of a helium-free balloon (1) manufactured through this process. Such, creases are not to be construed as seams, but merely artifacts of the joining of two or more blow mold components to create a desired blow mold cavity (11).

Figure 1C:
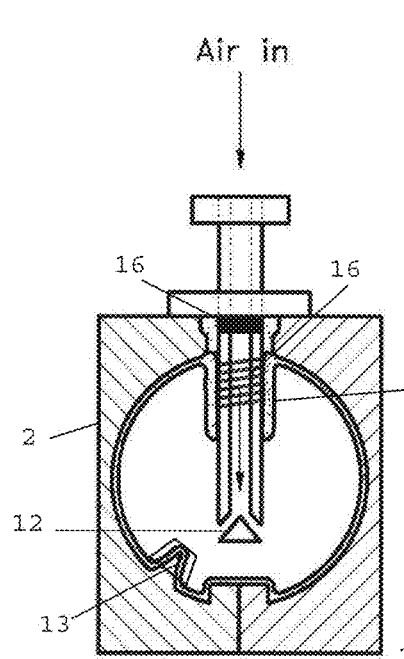
Figure 1D:
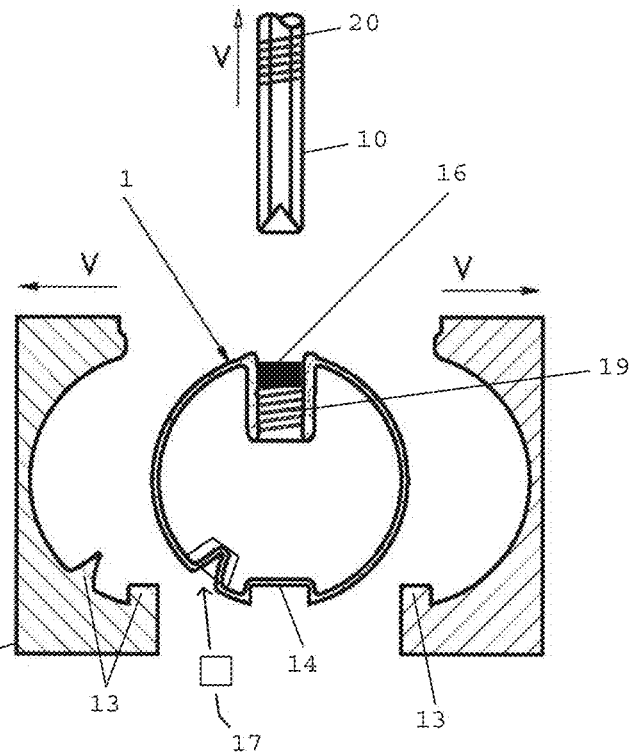

As generally shown in FIG. 1C, in one embodiment pressurized air may be injected through a blowing rod (10), in this embodiment regulated by a one-way valve (12), into the exemplary blow mold (2) causing the molding material (3) component of the preform (5) to expand outward and conform to the shape of the blow mold cavity (11) forming the shape of a helium-free-balloon. As shown in FIG. 1D, in this embodiment, the external attachment (16), being transiently secured to the blowing rod (10), may be adhered to the heated molding material as it is expanded, such that when the molding material is chilled and the blowing rod (10) is removed, the external attachment (16) may remain adhered to the helium-free balloon (1) forming an integrated structure that may be ejected from the blow mold (2).

Referring again generally to FIGS. 1B-D, in one embodiment, a blow mold (2) may include one or more extended protrusions (13). In one preferred embodiment, extended protrusions (13) may include extension, or depressions that may form a discontinuous internal surface of the blow mold (2). In the preferred embodiment shown in the FIGS. 1B-D, when a preform (5) is secured into the blow mold (2) such that when pressurized air forces the expansion of the preform (5) to conform to the internal blow mold's cavity, the molding material (3) may conform to the outside surface of the protrusion which, in this embodiment, may generate an internal channel (14) in the molded helium-free balloon (1). In certain embodiments this extended protrusion (13) may include a beveled or angled point such that it may only hold a limited amount of injected molding material (3) at the protrusions point.

In this embodiment, the resulting internal channel (14) may allow for the insertion of one or more external attachments (16), or other components, such as an inflation plug (17) as will be discussed below. In one preferred embodiment, for example a valve may be inserted into and/or secured by an internal channel (14) such that the valve may pierce any remaining molding material at the terminal point of the internal channel (14) allowing air to pass into and out of the helium-free balloon (14) during inflation and/or deflation. In other embodiments this piercing may not occur nor be required. In certain embodiments, examples of external attachments (16) may include a plug or other hard plastic attachment that may further be coupled with a valve or balloon support apparatus, such as those described in U.S. patent application Ser. No. 14/743,839, (which is incorporated in its entirety herein by reference). Examples of an inflation plug (17) may include a plug; a valve; a hard plastic inflation plug; a threaded inflation plug; a beveled inflation plug; and a ribbed inflation plug in certain embodiments.

Referring again to FIGS. 1B-D, one or more secondary external attachments (16) may be integrated with a helium-free balloon (1). It should be noted that the term secondary does not connote a specific number or even contemplated number of external attachments, but is merely utilized for purposes of clarity. In one preferred embodiment, one or more secondary external attachments (16) may be positioned onto, or over an extended protrusion (16). In this embodiment, this may occur prior to insertion of the blowing rod (10), and may be positioned manually or even automatically. As generally shown in FIG. 1C-D, when pressurized air is injected into the blow mold cavity (11) forcing the expansion of the preform (5), causing it to conform to the internal blow mold's cavity, the molding material (3) may adhere to the secondary external attachment forming a helium-free balloon having an adhered, or integrated secondary external attachment (16). As noted above, a variety of secondary external attachments (16) may be contemplated in this invention, such as a hard plastic cylinder, as well as, but not limited to: a plug; a valve; a hard plastic external attachment; a threaded external attachment; a beveled external attachment; and a ribbed external attachment, to name a few. In alternative embodiments, an inflation plug (17), or even a balloon support or balloon support apparatus (23) and the like, may be inserted into a secondary external attachment (16) either prior to, or after the manufacture of the helium-free balloon (1).

Again referring to FIGS. 1A-D, in one embodiment a portion of a preform (5) may be manufactured to form an integral attachment position (19). For example, in one embodiment a blowing rod (10) may include one or more internal and/or external protrusions or depressions respectively. In the preferred embodiment shown in FIGS. 1A-D, a blowing rod (10) may have a threaded external surface such that when pressurized air is injected into the blow mold cavity (11) forcing the expansion of the preform (5) causing it to conform to the internal blow mold's cavity, such that the molding material (3) may adhere to the threaded external surface forming a mirrored threaded integral attachment position (19) in the helium-free balloon. In other embodiments, an integral attachment position (19) may be threaded, beveled, ribbed or fitted. Integral attachment position(s) (19) may also be formed by the internal surface of, for example a threaded blow mold (20). In a preferred embodiment, one or more integral attachment positions (19) may be configured to couple, or accept multiple components, such as an external attachment (16), a balloon support (23) a valve, plug and the like. Such couplings may include be a snap, twist, fitted or threaded type coupling among others.

Referring to FIG. 1D, in a preferred embodiment, a blow mold (2) may include a position allowing for the generation of an extended support lip (7) or extended support lip attachment position (7) the terms being generally interchangeable. In the preferred embodiment shown in FIGS. 1A-D, a blow mold (2) may be configured to form an extended portion of molding material around, in this instance the blowing rod (10). In this embodiment, the internal surface of the extended support lip (7) comprises an integral threaded attachment position (19) where the extended support lip (7) may provide internal support and an extension allowing for a longer threaded track for coupling an external attachment (16), inflation plug (17) or balloon support or balloon support apparatus (23) and the like. Additional configurations of such extended support lips (7) may also include, but not be limited to: a beveled extended support lip (7); a ribbed extended support lip (7), and the like.

Generally referring to FIGS. 3A-C, in another embodiments a preform (5) may be removed from the preform mold and may further be reheated and stretched, expanding the original length, prior to being placed in a helium-free blow mold (2). In this embodiment, compressed air may then be blown into the stretched preform causing it to expand and conform to the mold's internal cavity (11). Once the material is cooled, the mold may be opened and the finished helium-free balloon (1) may be ejected from the mold cavity. Similar to the embodiments noted above, in this embodiment, the mold may include extended protrusion (13) that may form internal channels (14), as well as support extensions cavities. This embodiment may also include one or more integral attachment positions (17) as described above.

In one additional embodiment, a helium-free balloon (1) may be formed from a parison (4). Generally referring to FIGS. 2A-D, in one preferred embodiment, similar to above, a molding material may be selected and heated to a desired viscous state. As shown in the preferred embodiment in FIG. 2A, one or more molding materials (3) may be placed in an extruder barrel (6) which, in this embodiment, may have an assembly that may also heat and melt the molding material. This heated molding material (3) may be extruded through, in this embodiment, an approximately circular die forming a parison, which may include an extruded column of viscous molding material (3).

As shown in FIG. 2A, this parison (4) may be inserted into a blow mold (2), which in some embodiments may be chilled. As demonstrated in FIG. 2B, this blow mold (2) may include two or more components that maybe brought together forming a blow mold cavity (11) around the parison (4). It should be noted that the joining of two blow mold components may cause the formation of small creases in the external surface of a helium-free balloon (1) manufactured through this process. Such creases are not to be construed as seams, but merely artifacts of the joining of two or more blow mold components to create a desired blow mold cavity (11). Again referring to FIG. 2B, a blow pin (9) may be inserted into the internal cavity of the extruded parison (4). This blow pin (9) may be configured to inject pressurized air into said blow mold causing the parison (4) to expand outward and conform to the shape of the blow mold cavity (11) forming a helium-free-balloon. (1) This blowing pin (9) may be removed and the helium-free balloon (1) ejected from the blow mold (2).

In one embodiment shown in FIGS. 2A-D, one or more external attachments (16) may be secured to a blow pin (9) which may further be inserted into a parison (4). In an alternative embodiment, one or more external attachments (16) may be directly coupled with a parison (4). In a preferred embodiment this external attachment (16) may be configured to be coupled with a balloon support (23). In one embodiment, this external attachment (16) may include a hard plastic cylinder that may be configured to be provide a strong anchor point for an external balloon support (23) or other component. In alternative embodiments, this external attachment (16) may include a variety of configurations and components, including but not limited to: a plug; a valve; a hard plastic external attachment; a threaded external attachment; a beveled external attachment; a ribbed external attachment to name a few.

Referring again to FIG. 2A, in this embodiment an external attachment (16) is secured to a blow pin (9), which may then be inserted into a blow mold (2). In this embodiment, the external attachment (16) may be transiently secured to the blow pin (9), such that, as will be discussed below, when the blow pin (9) is removed, the external attachment (16) may stay attached, or integrated, to the molded helium-free balloon (1). Again referring to FIG. 2A, a molding material (3), such as a thermoplastic—possibly in some cases in the form of a granule or pellet—may be heated to a point where it may be sufficiently viscous to be extruded into a parison (4). Again referring to FIGS. 2A-D, in this preferred embodiment, the viscous heated molding material (3) may be secured and/or adhered to the external attachment (16), such that the blow pin (9) may be removed leaving the external attachment (16) adhered to the helium-free balloon (1).

Similar to the description above, in one embodiment, a blow mold (2) may include one or more extended protrusions (13). In one preferred embodiment, extended protrusions (13) may include extension, or depressions that may form a discontinuous internal surface of the blow mold (2). In one preferred embodiment, when pressurized air forces the expansion of a parison (4) to conform to the internal blow mold's cavity, the molding material (3) may conform to the outside surface of the protrusion which, in this embodiment, may generate an internal channel (14) in the molded helium-free balloon (1). In certain embodiments this extended protrusion (13) may include a beveled or angled point such that it may only hold a limited amount of injected molding material (3) at the protrusion point.

In this embodiment, the resulting internal channel (14) may allow for an external attachment (16), or other components, such as an inflation plug (17) as previously discussed. In one preferred embodiment, for example a valve may be inserted into and/or secured by an internal channel (14) such that the valve may pierce any remaining molding material at the terminal point of the internal channel (14) allowing air to pass into and out of the helium-free balloon (14) during inflation and/or deflation. In certain embodiments, examples of external attachments may include a plug or other hard plastic attachment that may further be coupled with a valve or balloon support apparatus, such as those described in U.S. patent application Ser. No. 14/743,839, (which is incorporated in its entirety herein by reference). Examples of inflation plugs (17) may include a plug; a valve; a hard plastic inflation plug; a threaded inflation plug; a beveled inflation plug; and a ribbed inflation plug in certain embodiments.

Again, similar to the discussion above, in certain embodiments, one or more secondary external attachments (16) may be integrated with a helium-free balloon (1). In one preferred embodiment, one or more secondary external attachments (16) may be positioned onto or over extended protrusion(s) (16). This may occur prior to insertion of the blow pin (9), and may be positioned manually or even automatically. In this example, when pressurized air is injected into the blow mold cavity (11) forcing the expansion of the parison (4) to conform to the internal blow mold's cavity, the molding material (3) may adhere to a secondary external attachment (16). This embodiment may result in the manufacture of a helium-free balloon (1) having an adhered, or integrated secondary external attachment (16). As noted above, a variety of secondary external attachments (16) may be contemplated in this invention, such as a hard plastic cylinder, as well as but not limited to: a plug; a valve; a hard plastic external attachment; a threaded external attachment; a beveled external attachment; and a ribbed external attachment. In alternative embodiments, an inflation plug (17), or even a balloon support or balloon support apparatus (23) and the like, may be inserted into a secondary external attachment (16) either prior to or after the manufacture of the helium-free balloon (1).

In yet another embodiment a portion of a parison (4) may be manufactured to form an integral attachment position (19). For example, in one embodiment a blow pin (9) and/or blow mold (10) may include one or more internal and/or external protrusions or depressions respectively. In an embodiment generally shown in FIGS. 2A-D, a blow mold (2) or blow pin (9) may have a threaded internal surface such that when pressurized air is injected into the blow mold cavity (11) forcing the expansion of the parison (4) to conform to the internal blow mold's cavity, the molding material (3) may adhere to a threaded surface forming a mirrored threaded integral attachment position (19) in the helium-free balloon (1). In other embodiments, an integral attachment position (19) may be threaded, beveled, ribbed or fitted and the like. In a preferred embodiment, one or more integral attachment position (19) may be configured to couple, or accept multiple components, such as an external attachment (16), a balloon support (23), a valve, plug and the like. Such coupling could include a snap, twist, fitted or threaded type coupling among others types of coupling configurations.

In another embodiment, the inventive technology may include the use of integral couplings (21) to manufacture an integrated helium-free balloon (1). In one preferred embodiment, outlined generally in FIGS. 4A-C, a preform (4) and/or parison (5) may be generated as generally described above. In this preferred embodiment an integral coupling (21) may be adhered to the preform (5) and/or parison (5). In certain embodiments, an integral coupling (21) may be a rigid, or semi-rigid coupler, such as an overmolded plastic component. In some embodiments not specifically shown, an integral coupling (21) may have extensions, ridges or other surface features to facilitate attachment to a preform (5) and/or parison (4).

In certain embodiments one or more integral couplings (21) may be secured to a blowing rod (10) or blow pin (9) and adhered to a helium-free balloon as described above. In other embodiments, one or more integral coupling (21) may be manually or automatically adhere, or coupled with a preform (5) or parison (4). Again as generally described above, pressurized air may be injected through an integral coupling aperture (25) on the integral coupling (21) causing the helium-free balloon preform (5) or parison (4) to expand outward and conform to the shape of the blow mold cavity (11) forming a helium-free-balloon (1). In certain embodiments the step of adhering an integral coupling (21) to a preform (5) or parison (4) may be transient, such that the inflation of the heated molding material (3) may adhere the integral coupling (21) to a helium-free balloon (1).

Referring again to FIG. 4, in certain embodiments, a balloon support adaptor (22) may be secured to the integral coupling (21) forming an airtight seal. Such securement/coupling, as with all example discussed herewith, may be permanent and/or transient in nature. Regardless, in certain embodiments the step of securing a balloon support adaptor to an integral coupling forming an airtight seal comprises the step of: securing a balloon support adaptor to an integral coupling forming an airtight seal through a snap connection; securing a balloon support adaptor to an integral coupling forming an airtight seal through a twist connection; securing a balloon support adaptor to an integral coupling forming an airtight seal through a threaded connection; securing a balloon support adaptor to an integral coupling forming an airtight seal through a beveled connection; securing a balloon support adaptor to an integral coupling forming an airtight seal through a ribbed connection; securing a balloon support adaptor to an integral coupling forming an airtight seal through a fitted connection; securing a balloon support adaptor to an integral coupling forming an airtight seal through an adhesive connection; and securing a balloon support adaptor to an integral coupling forming an airtight seal through a quick release connection and the like.

Again, as shown in FIG. 4, in this preferred embodiment, the balloon support adaptor (22) may further be coupled to a balloon support (23). In one embodiment, a balloon support adaptor (22) may be coupled with, for example a balloon support stem (24) or even balloon cluster support which may support a plurality of helium-free balloons, through a threaded or other coupling mechanism. In some embodiments, a balloon support stem (24) may be a rigid, or semi rigid rod, perhaps made of fiberglass, metal, plastic or other composite material and further may be overmolded. Additional embodiments may include a coupling bracket that may be configured to be coupled with various components as discussed herein. As shown in FIG. 4C, certain embodiments may include a balloon support base (26) that may be coupled with a balloon support stem (24) by, in this case a balloon support adaptor (25). In one preferred embodiment, a balloon support adaptor (25), coupled with an integral coupling (21), may be inserted through an aperture on a balloon support base (26), which in this embodiment is a support cup that may conform to the external surface of the helium-free balloon, and further be coupled with a balloon support stem (24). While in this embodiment, the balloon support base (26), balloon support adaptor (25) and balloon support stem (24) are shown as desperate components, in certain embodiments such components may comprise a single unitary or integrated component. In other examples, a balloon support base (26) and balloon support adaptor (25) may form a single unitary component. While in further examples, a balloon support base (26) and balloon support stem (24) may form a single unitary component. In one specific embodiment, an integral coupling (21) may be coupled with a balloon support (23) forming an airtight seal.

Additionally, as shown in FIG. 1B, embodiments may include a blow mold (2) having one or more extended protrusions (13) which may form one or more internal channels (14) and/or support secondary external attachments (16) as previously described. As such, in other embodiments, an integral coupling (21) may not include an integral coupling aperture (25), such that air may be injected through an internal channel (14). To prevent deflation, for example, an inflation plug (17) may be inserted into the internal channel (14) to prevent any significant loss of air.

Similarly, in certain embodiments the step of coupling a balloon support adaptor (22) to a balloon support (23) may include the step selected from the consisting of: twist coupling a balloon support adaptor to a balloon support; snap coupling a balloon support adaptor to a balloon support; coupling a balloon support adaptor to a balloon support through a fitted connection; coupling a balloon support adaptor to a balloon support through an adhesive connection; coupling a balloon support adaptor to a balloon support through a fitted connection; coupling a balloon support adaptor to a balloon support through a beveled connection; and coupling a balloon support adaptor to a balloon support through a quick release connection and the like.

As can be seen in FIG. 4, in one embodiment, air may be injected through an integral coupling aperture (25) on the integral coupling (21) causing the helium-free balloon (2) to inflate. In this embodiment, to prevent loss of air, an integral coupling (21) may be coupled with an inflation plug (17), or further coupled with a balloon support (23) forming an air tight seal. In yet other embodiments, a balloon support adaptor (22) may include an aperture whereby air may pass through an integral coupling aperture (25) on the integral coupling (21) causing the helium-free balloon (2) to inflate. In this embodiment, to prevent loss of air, a balloon support adaptor (22) may be coupled with an inflation plug (17), or further coupled with a balloon support (23) forming an air tight seal.

In another preferred embodiment, an appropriate molding material, such as a flexible thermoplastic, may be formed into a preform (5) or parison (4) as generally described above. In this embodiment, for example a portion of the preform (5) and/or parison (5) may not be inserted into the blow mold (2), or may be positioned in a blow mold (2) such that that a portion of the preform (5) or parison (4) is not expanded, or is minimally expanded so as to generally maintain its general original shape. In this embodiment, the unexpanded preform (5) or parison portion (4) may have integral attachment positions (19) as generally described above, such as a threaded surface that may accept an external attachment (16), a valve, inflation plug (17) or the component as generally discussed herein. In another embodiment, this un- or minimally expanded preform (5) or parison (4) portion may be overmolded with a more rigid material, such as a hard plastic to create one or more attachment positions. In another embodiment, this un- or minimally expanded preform or parison portion may be overmolded with a more rigid material, such as a hard plastic to create an attachment position, such as generally described in U.S. patent application Ser. No. 14/743,839, (which is incorporated in its entirety herein by reference). For example, in this embodiment, an external fitting or plug or even external support may be overmolded so as to be secured to the un- or minimally expanded preform (5) or parison (4) portion.

In yet another embodiment, an integral attachment position (19) may also be overmolded with a more rigid material, such as a hard plastic. In a preferred embodiment, for example an external attachment, such as a plug or other fitting that may be secured to an external support and may be further secured in an internal channel (14) or integral attachment position (19). This external attachment may then be overmolded, again with a more rigid material forming a secure coupling between the helium-free balloon (1), and an external attachment (16), integral coupling (21) and/or balloon support adaptor (22), as well as any additional balloon support (23) components that may be secured to such fittings or helium-free balloon.

In another preferred embodiment not specifically shown, a blow mold (2) may include one or more integral or transient support extensions cavities. In this embodiment, when pressurized air is inserted into the blow mold's cavity the support extension cavities may be filled forming integral support extensions such as those demonstrated in U.S. patent application Ser. No. 14/743,839 (which is incorporated in its entirety herein by reference). These support extension cavities may include an integral attachment position or external attachment (16) that may be used to, for example secure an internal fitting or balloon support (23), again as described in the incorporated application above.

As can be appreciated, in addition to the thermoplastic molding materials (3) described above, other molding materials that may be included in the inventive technology may include but not be limited to: low-, linear-low and/or high-density polyethylene; cross linked grades of polyethylene; ethylene vinyl acetate; plasticine; plastic; adhesive-type polyethylene; polyvinyl chloride; nylon; polycarbonate; PET; polyesters; polypropylene; or any hybrid of the same.

As also noted above, in certain embodiments discussed above a helium-free balloon blow mold may be created with the desired size and shape of the eventual balloon. For example, a blow mold may be created with the desired size and shape of the eventual helium-free balloon. While the embodiments generally show a traditional round-shaped balloon, a variety of various shapes and sizes can be contemplated within this invention. For example, a blow mold may be formed to create seamless helium-free balloons having various shapes and sizes including, but not limited to: round; oblong; angular; curvilinear; angles; depressions; bubbling; protrusions; kiss-off's, almost kiss-off's; ribbing and the like. Additional embodiments may include multi-chambered seamless helium-free balloon blow molds where entire seamless, helium-free balloon clusters having a plurality of helium-free balloons and/or helium-free balloon clusters, may be created. In addition, internal elements may be included in the mold. Such internal elements may include additional functional and/or creative supports, as well as perhaps color or design elements.

In certain embodiments the above referenced principles of blow molding may be used to manufacture a seamless helium-free balloon. It should be noted at the outset that the term seamless, as related to this invention, should be construed to encompass a helium-free balloon that is manufactured without physically joined disparate pre-formed elements and/or pieces. "Seamless" may also denote a helium-free balloon that does not have an internal, and/or external seems. It should further be noted that surface creases may be present in some embodied helium-free balloons, however, such molding artifacts, such as is formed where two molds may be positioned together is not to be construed as a seam.

Additional embodiments not specifically shown may include the step of inserting a quantity of reflective material into said helium-free balloon (1). In this embodiment, the reflective material may adhere to the internal surface of the helium-free balloon (1), which may be sufficiently viscous to hold the reflective material generally in place, and further be visible through the translucent material. In some embodiments, the internal surface of the helium-free balloon may be electrostatically charged so as to adhere the reflective material through static attraction. Additional embodiments may include the use of adhesives to coat the internal surface of the helium-free balloon (1) so as to adhere the reflective material. In this preferred embodiment, the presence of the adhered reflective material may be visible through the translucent material and further provide color, as well as a visible reflective attractant to the helium-free balloon (1) increasing its ability to be noticed by consumers.

In one preferred embodiment, a quantity of one or more reflective materials may be injected into a helium-free balloon through an external opening or aperture, such as an integral attachment position (19). In this preferred embodiment, one or more reflective materials may be injected, or placed inside of a helium-free balloon (1) through an external opening. In certain embodiments reflective material injected into the internal cavity of a helium-free balloon (1) may include a variety of reflective, or semi-reflective and/or colored material. Examples of such reflective materials may include, but not be limited to: reflective plastic, glitter, reflective copolymer plastics, aluminum foil, Mylar, titanium dioxide coated plastic, iron oxide coated plastic, titanium dioxide coated composite, iron oxide coated composite, colored powder, reflective dyes, powder dyes, and/or liquid dyes. The amount and type of reflective material may include a mixture of various types, or similar types with different characteristics, such as intensity of reflection, color and/or size. In addition, one or more reflective materials may be injected into a helium-free balloon (1), of example, under pressure, or may be manually inserted into a helium-free balloon (1), for example by a consumer. In this embodiment, a consumer may purchase one or more translucent helium-free balloons (1) and separately choose, and/or purchase one or more reflective materials. In this embodiment, a consumer may add a customized amount, and type of reflective material dependent on a specific set of characteristics, such as color, reflective appearance and the like.

In one embodiment, one or more reflective materials may be combined/mixed with a translucent or other molding material (3), forming a reflective molding material. In this embodiment, this reflective molding material may be used to manufacture a helium-free balloon as described above and form a internally reflective helium-free balloon where the reflective material is internally positioned throughout the helium-free balloons walls. Additional embodiments may include the injection of additional reflective material into the internally reflective helium-free balloon to generate a customized color, mix of colors, or reflective properties.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to manufacture a helium-free balloon system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a method for manufacturing a helium-free balloon as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention, such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. A method of manufacturing an integrated helium-free balloon system comprising the steps of:
    establishing a preform mold;
    positioning an integral coupling into said preform mold;
    heating a quantity of molding material;
    injecting said heated molding material into said preform mold forming a helium-free balloon preform;
    inserting said helium-free balloon preform into a blow mold;
    adhering said helium-free balloon preform to said integral coupling;
    injecting pressurized air through an integral coupling aperture on said integral coupling causing said helium-free balloon preform to expand outward and conform to the shape of the blow mold cavity forming a helium-free-balloon;
    ejecting said helium-free-balloon; and
    securing a balloon support adaptor to said integral coupling forming an airtight seal.

2. A method of manufacturing an integrated helium-free balloon system as described in claim 1 wherein said step of positioning an integral coupling into said preform mold comprises the step of positioning an integral coupling into said preform mold selected from the group consisting of: positioning an integral coupling into onto blowing pin; and positioning an integral coupling into around blowing rod.

3. A method of manufacturing an integrated helium-free balloon system as described in claim 1 wherein said step of securing a balloon support adaptor to said integral coupling forming an airtight seal comprises the step of securing selected from the group consisting of: securing a balloon support adaptor to said integral coupling forming an airtight seal through a snap connection; securing a balloon support adaptor to said integral coupling forming an airtight seal through a twist connection; securing a balloon support adaptor to said integral coupling forming an airtight seal through a threaded connection; securing a balloon support adaptor to said integral coupling forming an airtight seal through a beveled connection; securing a balloon support adaptor to said integral coupling forming an airtight seal through a ribbed connection; securing a balloon support adaptor to said integral coupling forming an airtight seal through a fitted connection; securing a balloon support adaptor to said integral coupling forming an airtight seal through an adhesive connection; and securing a balloon support adaptor to said integral coupling forming an airtight seal through a quick release connection.

4. A method of manufacturing an integrated helium-free balloon system as described in claim 1 and further comprising the step of coupling said balloon support adaptor to a balloon support.

5. A method of manufacturing an integrated helium-free balloon as described in claim 4 wherein said step of coupling said balloon support adaptor to a balloon support comprises the step selected from the group consisting of: twist coupling said balloon support adaptor to a balloon support; snap coupling said balloon support adaptor to a balloon support; coupling said balloon support adaptor to a balloon support through a fitted connection; coupling said balloon support adaptor to a balloon support through an adhesive connection; coupling said balloon support adaptor to a balloon support through a fitted connection; coupling said balloon support adaptor to a balloon support through a beveled connection; and coupling said balloon support adaptor to a balloon support through a quick release connection.

6. A method of manufacturing an integrated helium-free balloon system as described in claim 4 wherein said step of coupling said balloon support adaptor to a balloon support comprises the step of coupling said balloon support adaptor with a balloon support stem.

7. A method of manufacturing an integrated helium-free balloon system as described in claim 6 and further comprising the step of coupling a balloon support base and said balloon support stem through said balloon support adaptor.

8. A method of manufacturing an integrated helium-free balloon system as described in claim 7 wherein said step of coupling a balloon support base and said balloon support stem through said balloon support adaptor comprises the step of inserting said balloon support adaptor through said balloon support base and coupling said balloon support adaptor with said balloon support stem.

9. A method of manufacturing an integrated helium-free balloon system as described in claim 8 wherein said step of inserting said balloon support adaptor through said balloon support base and coupling said balloon support adaptor with said balloon support stem comprises the step of inserting said balloon support adaptor through said balloon support base and threadably coupling said balloon support adaptor with said balloon support stem.

10. A method of manufacturing an integrated helium-free balloon system as described in claim 4 wherein said step of coupling said balloon support adaptor to a balloon support comprises the step of coupling said balloon support adaptor with a balloon support stem having an integrated balloon support base.

11. A method of manufacturing an integrated helium-free balloon system as described in claim 1 wherein said step of inserting said helium-free balloon preform into a blow mold comprises the step of inserting said helium-free balloon preform into a blow mold having at least one extended protrusion.

12. A method of manufacturing an integrated helium-free balloon system as described in claim 11 wherein said step of injecting pressurized air through an integral coupling aperture on said integral coupling causing said helium-free balloon preform to expand outward and conform to the shape of the blow mold cavity forming a helium-free-balloon comprises the step of injecting pressurized air through an integral coupling aperture on said integral coupling causing said helium-free balloon preform to expand outward and conform to the shape of the blow mold cavity having at least one extended protrusion forming a helium-free-balloon having at least one internal channel.

13. A method of manufacturing an integrated helium-free balloon system as described in claim 12 and further comprising the step of inserting an inflation plug into said internal channel.

14. A method of manufacturing an integrated helium-free balloon system as described in claim 1 wherein said balloon support adaptor comprises a balloon support adaptor having a balloon support base.

15. A method of manufacturing an integrated helium-free balloon system comprising the steps of:
heating a quantity of molding material;
extruding said heated molding material to form a parison;
inserting said parison into a blow mold;
closing said blow mold over said parison;
securing an integral coupling to said parison;
connecting at least one blow pin with said integral coupling;
injecting pressurized air through an integral coupling aperture on said integral coupling causing said parison to expand outward and conform to the shape of the blow mold cavity forming a helium-free-balloon and adhering to said integral coupling; and
removing said blowing pin where said integral coupling remains adhered to said helium-free balloon;
ejecting said helium-free-balloon;
injecting air through an integral coupling aperture on said integral coupling causing said helium-free balloon to inflate; and
securing a balloon support adaptor to said integral coupling forming an airtight seal.

16. A method of manufacturing an integrated helium-free balloon system as described in claim 15 and further comprising the step of coupling said balloon support adaptor to a balloon support.

17. A method of manufacturing an integrated helium-free balloon system as described in claim 16 wherein said step of coupling said balloon support adaptor to a balloon support comprises the step of coupling said balloon support adaptor with a balloon support stem.

18. A method of manufacturing an integrated helium-free balloon system as described in claim 17 wherein said step of coupling a balloon support base and said balloon support stem through said balloon support adaptor comprises the step of inserting said balloon support adaptor through said balloon support base and coupling said balloon support adaptor with said balloon support stem.

19. A method of manufacturing an integrated helium-free balloon system as described in claim 18 wherein said step of inserting said balloon support adaptor through said balloon support base and coupling said balloon support adaptor with said balloon support stem comprises the step of inserting said balloon support adaptor through said balloon support base and threadably coupling said balloon support adaptor with said balloon support stem.

20. A method of manufacturing an integrated helium-free balloon system as described in claim 16 wherein said step of coupling said balloon support adaptor to a balloon support comprises the step of: coupling said balloon support adaptor with a balloon support stem having an integrated balloon support base.

21. A method of manufacturing an integrated helium-free balloon system as described in claim 16 wherein said step of coupling said balloon support adaptor to a balloon support comprises the step selected from the consisting of: twist coupling said balloon support adaptor to a balloon support; snap coupling said balloon support adaptor to a balloon support; coupling said balloon support adaptor to a balloon support through a fitted connection; coupling said balloon support adaptor to a balloon support through an adhesive connection; coupling said balloon support adaptor to a balloon support through a fitted connection; coupling said balloon support adaptor to a balloon support through a beveled connection; and coupling said balloon support adaptor to a balloon support through a quick release connection.

22. A method of manufacturing an integrated helium-free balloon system as described in claim 15 wherein said step of inserting said parison into a blow mold comprises the step of inserting said parison into a blow mold having at least one extended protrusion.

23. A method of manufacturing an integrated helium-free balloon system as described in claim 22 wherein said step of injecting pressurized air through an integral coupling aperture on said integral coupling causing said parison to expand outward and conform to the shape of the blow mold cavity forming a helium-free-balloon and adhering to said integral coupling comprises the step of injecting pressurized air through an integral coupling aperture on said integral coupling causing said parison to expand outward and conform to the shape of the blow mold cavity forming a helium-free-balloon and adhering to said integral coupling and forming a helium-free-balloon having at least one internal channel.

24. A method of manufacturing an integrated helium-free balloon system as described in claim 23 and further comprising the step of inserting an inflation plug into said internal channel.

25. A method of manufacturing an integrated helium-free balloon system as described in claim 15 wherein said balloon support adaptor comprises a balloon support adaptor having a balloon support base.

26. A method of manufacturing an integrated helium-free balloon system comprising the steps of:
establishing a preform mold;
positioning an integral coupling into said preform mold;
heating a quantity of molding material;
injecting said molding material into said preform mold;
adhering said molding material to said integral coupling generating a preform;
injecting pressurized air through an integral coupling aperture on said integral coupling causing said helium-free balloon preform to expand outward and conform to the shape of the blow mold cavity forming a helium-free-balloon;
ejecting said helium-free-balloon; and
injecting air through an integral coupling aperture on said integral coupling causing said helium-free balloon to inflate; and
coupling said integral coupling to a balloon support forming an airtight seal.

\* \* \* \* \*